Nov. 14, 1967  R. G. OSTENSEN  3,352,218
SHEET FEED APPARATUS
Original Filed Jan. 3, 1963  3 Sheets-Sheet 1

INVENTOR.
RALPH G. OSTENSEN
BY
Strauch, Nolan & Neale
ATTORNEYS

INVENTOR.
RALPH G. OSTENSEN

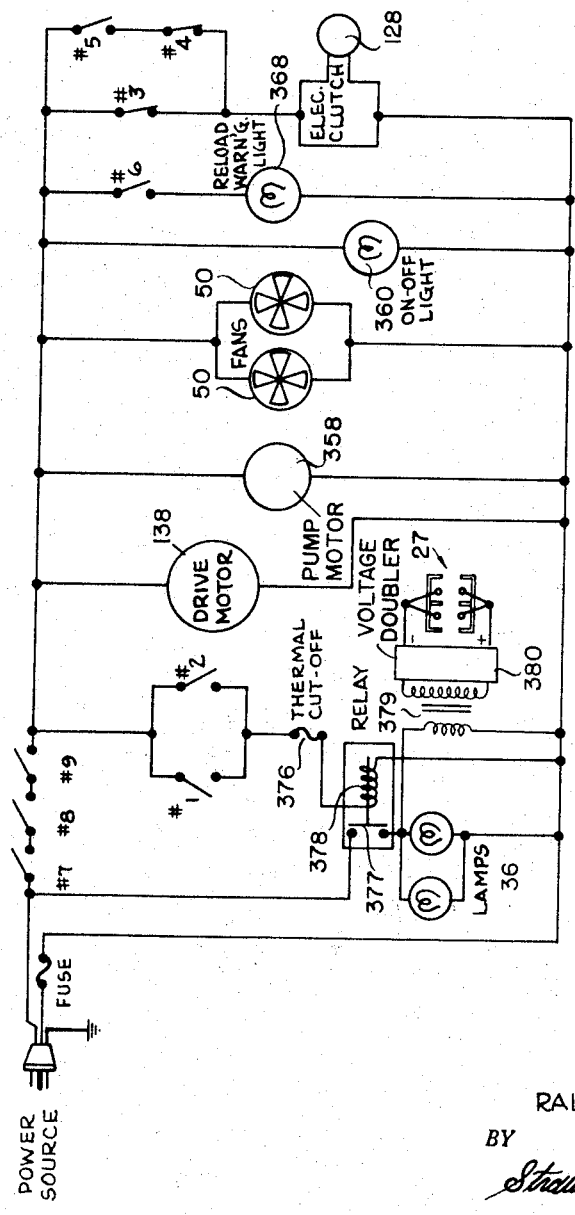

United States Patent Office 3,352,218
Patented Nov. 14, 1967

3,352,218
SHEET FEED APPARATUS
Ralph G. Ostensen, Morton Grove, Ill., assignor to SCM Corporation, New York, N.Y., a corporation of New York
Original application Jan. 3, 1963, Ser. No. 249,248. Divided and this application Aug. 17, 1964, Ser. No. 390,127
17 Claims. (Cl. 95—1.7)

This invention relates to duplicating apparatus and more particularly, to a photocopying apparatus having a copy paper feed system adapted to control automatically movement of the copy sheet thereby requiring that the operator handle only the original document to be copied. This application is a division of my application Ser. No. 249,248 filed Jan. 3, 1963, now abandoned.

A principal object of the present invention resides in providing apparatus for and a method of feeding the leading edge of a sheet of copy paper into a paper transport so that the copy sheet may be moved through the duplicating apparatus in timed relation with an original document to be copied that is manually inserted into the document feed system of the apparatus.

Another object of the invention is to provide a novel copy paper feed arrangement for feeding the leading edge of the copy paper from the paper supply compartment into the copy paper feed system. In the preferred embodiment, this is accomplished by an intermittent paper feed which separates one sheet of copy paper at a time from a stack of pre-cut copy paper and advances such separated sheet to a position where the further advancement of the sheet can be controlled with precision. When the original document is inserted in the apparatus, a switch is actuated by the leading edge of the document to thereby energize the copy paper drive system. The original document and the copy sheet move in timed relation through an exposing station where a graphic image of the document is transferred to the copy sheet and the copy sheet then advanced through a developing station. While the exposed copy sheet is advancing through the developing station, the leading edge of the next sheet of copy paper is separated from the stack of copy paper in the supply compartment and advanced to the ready position at which time the apparatus is prepared to accept the next document to be copied.

Still another object resides in the provision of a novel single sheet separator which enables the top sheet from a stack of pre-cut paper to be fed singly into the copy paper drive transport of the copy apparatus.

Yet another object resides in providing a novel sequencing circuit for effecting synchronization of the movement of the original or document to be copied and the paper sheet together with a switching control to appropriately position the copy sheet part way through its feed system before the original is inserted.

These and other objects will become more fully apparent from the claims, and from the description as it proceeds in connection with the drawings wherein:

FIGURE 5 is a schematic wiring diagram of the printer.

General description

Figures 1, 2, 3:
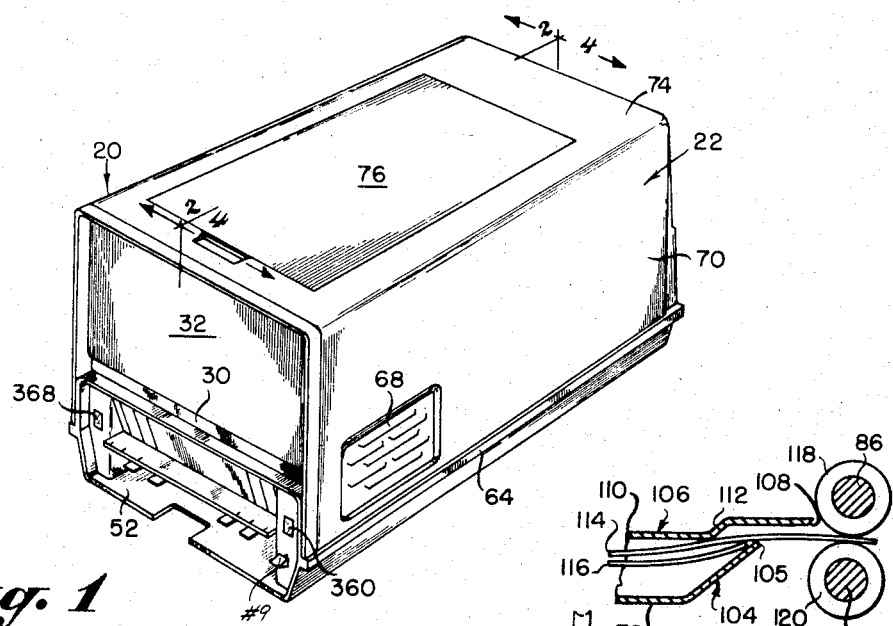
FIGURE 1 is a perspective view as seen from the front, right corner of the electrostatic printer of the present invention shown with its cover in place.
FIGURE 2 is a sectional view of the printer of FIGURE 1 and is taken substantially along line 2—2 of that figure.
FIGURE 3 is a fragmentary view to an enlarged scale, of the copy sheet feed means of FIGURE 2 and illustrates a novel arrangement for advancing sheets of copy paper singly through the printer.
Figure 4:
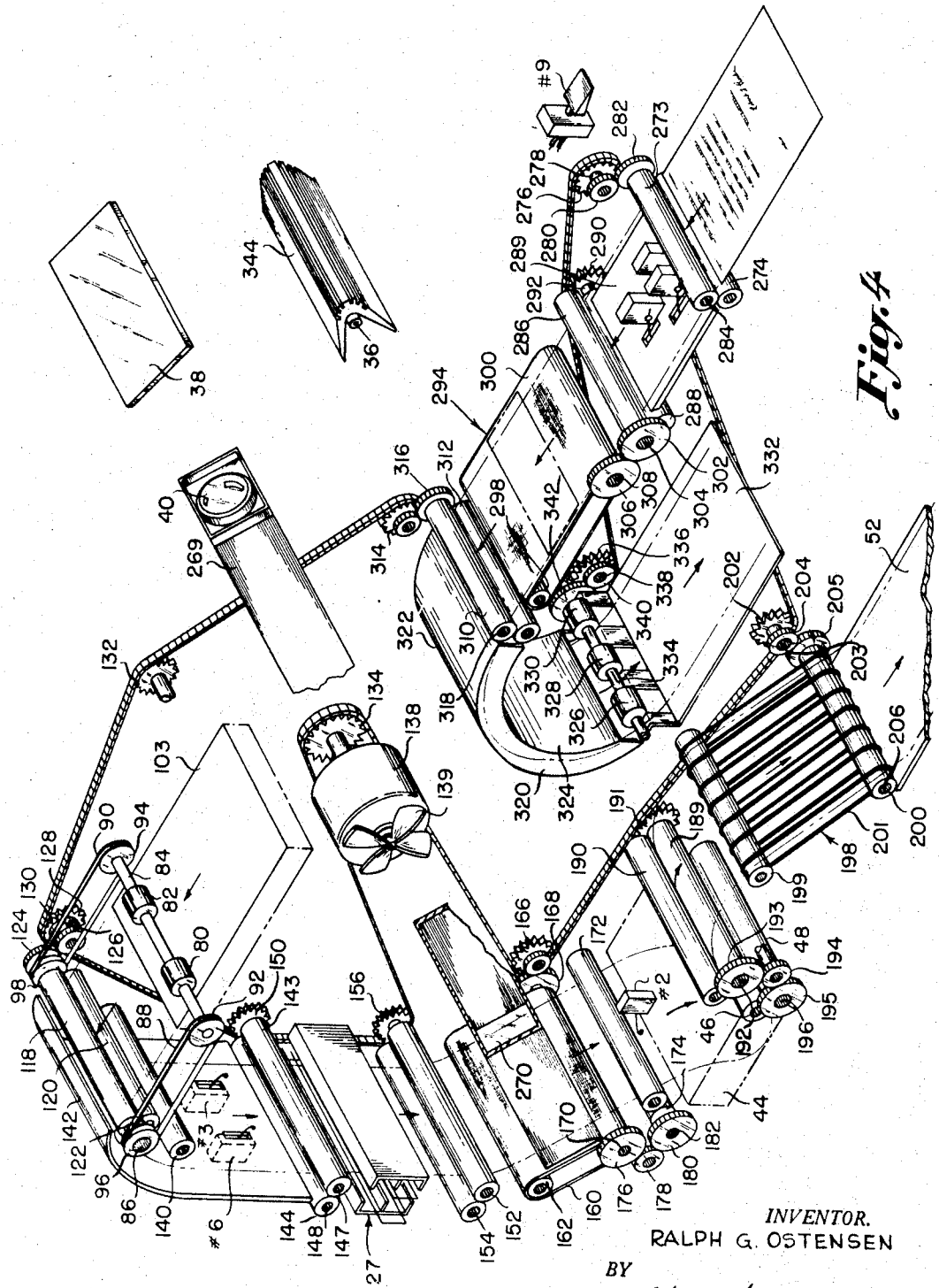
FIGURE 4 is a perspective view as seen from the front, left corner of the printer of FIGURE 1 with the cover removed illustrating the arrangement and disposition of the internal components.

Referring now to FIGURES 1, 2 and 4, the electrostatic printing machine 20 of the present invention including a housing 22 within which are arranged a paper supply compartment 24 into which photoconductive copy paper stack 103 may be loaded and a paper feed 26 for propelling sheets of the copy paper from compartment 24 through a corona charging unit 27 where a uniform charge of approximately −400 v. is imparted to the surface of the copy paper to imaging area adjacent the lower end of an image projector 28. The original to be copied is inserted through a horizontal slot 30 in the front wall 32 of cover 22 and is transported in timed relation to the movement of the copy paper to an imaging area below the forward end of image projector 28 where light is focused by projection lamp 36. The image is reflected from the surface of the original and a mirror 38 into the objective lens 40 of image projector 28 which projects the image onto the surface of the sheet of copy paper below corona unit 27. As the image strikes the copy paper, the charge on the latter is reduced by an amount determined by the intensity of the reflected light, with black portions of the original reflecting such a small light intensity as to affect the charge very little and white portions of the original reflecting sufficient light intensity as to almost completely release the latent electrostatic charge in the paper.

The exposed copy sheet now contains a latent image charge pattern which is preferably passed through a developing tank 44, described in detail in my copending application 143,086 filed Oct. 5, 1961, now Patent No. 3,202,526, where a liquid developer carrying positively charged particles is applied to the latent image bearing surface of the copy paper. The positively charged particles are attracted to the negatively charged areas to a degree determined by the charge at each position on the surface of the copy paper thereby producing a graphic image. The paper feed then moves the developed copy paper between squeegee rollers 46 and 48, which remove the excess developer from the copy paper and may provide a direct voltage of relatively low magnitude to control the density of the image and/or the cleanliness of the background of the developed copy paper.

The radiant heat of the projection lamps, together with air warmed by the projection lamps and blown across the copy paper by fans 50, removes substantially all of the remaining moisture from the surface of the copy paper. Thereafter, feed system 26 deposits the copy paper onto surface 52 at the bottom front of the printer from which it may be removed by the operator.

Detailed description

As is best shown in FIGURES 1 and 2, housing 22 includes a base 54 supported on longitudinally extending feet 58 (only one of which is shown), a pair of spaced apart vertical side walls 60 extending upwardly from the base, vertical front wall 32, which extends between the side walls, and rear wall 57. The details of housing 22 are of no significance to the present invention and may be varied as desired. Side walls 60, for example, are illustrated in FIGURE 2 as substantially continuous, sheetlike members. If desired, they may be formed of appropriate straps or brackets since they function primarily to support various components of the printer such as the rollers for the copy paper and original document feed systems shown best in FIGURE 4.

Supported on horizontal ledges 64 (FIGURE 1) formed adjacent the bottom of and extending around three sides of base 54 is a box-like open-ended cover 22 which may be secured in place by appropriate detachable fasteners (not shown). Louvers 68 formed in the exterior vertical side walls 70 of cover 22 permit cooling air to be circulated through printer 20 to remove the heat generated by its operation.

*Paper feed system*

As is best shown in FIGURE 2, a copy paper supply compartment 24 formed as a shallow sheet metal tray having bottom member 78 is supported from the side walls 60. Copy paper may be loaded into compartment 24 through the opening provided when hinged lid 76 in the top wall 74 of cover 22 is opened.

The copy paper is withdrawn from the paper supply compartment by a pair of feed rollers 80 and 82 (see FIGURE 4) fixed on rotatable shaft 84 which forms a part of paper feed 26. Shaft 84 is supported in parallel spaced relationship to a rotatable feed roller supporting shaft 86, and connected thereto by drive belts 88 and 90. A pair of brackets (not shown) extend between shafts 84 and 86 and are pivotable about the latter, thereby permitting feed rollers 80 and 82 to be displaced upwardly to the dotted line position shown in FIGURE 2 by opening movement of door 76 when the latter is opened to load copy paper into compartment 24. When door 76 is opened, horizontally extending pins 100 fixed on arms 102 attached to the opposite sides of door 76 engage the lower runs of belts 88 and 90, raising feed rollers 80 and 82 to the position shown in dotted lines. When door 76 is closed the feed rollers are lowered into engagement with the stack of copy paper identified by reference character 103.

As is shown in FIGURE 4, shaft 84 is driven by belts 88 and 90 which extend around pulleys 92 and 94 fixed to the ends of shaft 84 and around pulleys 96 and 98 fixed to the ends of shaft 86. The weight of shaft 84, its rollers 80 and 82 and pulleys 92 and 94 is sufficient to provide the necessary friction on the upper surface of the stack of paper 103 to cause the upper sheet to advance.

To insure proper functioning of printer 20, the sheets of copy paper must be fed one at a time from compartment 24. To prevent two sheets from sticking together and passing simultaneously through the machine, the novel arrangement of cooperating guides 104 and 106 shown in FIGURE 3 is employed. Guide 106 extends laterally of printer 20 substantially the width of the copy paper and is fastened by appropriate means to the side walls 60. Guide 106, which may be formed of sheet metal, has a main flat body portion, a leading edge 108 that is upwardly inclined to guide the top sheet of paper downwardly, and a horizontal rear edge portion 110 joined by an upwardly and rearwardly inclined connecting portion 112. The lower cooperating guide 104 is formed as an upwardly and rearwardly extending portion of bottom member of the paper loading tray 78 which terminates with edge 105. Edge 105 is at about the level of the lower surface of section 106, is located below the lower surface of section 110 by a distance equal roughly to the thickness of two or three sheets of the copy paper 114 and 116, and is located from inclined connecting portion 112 by a distance sufficiently small so that the stiffness of paper sheet 114 provides a bias force at edge 105 to prevent the next lower sheet 116 from advancing until sheet 114 has passed edge 105.

If two sheets of copy paper 114 and 116 advance together to be fed simultaneously between guides 104 and 106, the top sheet 114 only will move freely through the gap between the guides and on to rollers 118 and 120 of the copy paper feed system. The leading edge of the bottom sheet 116 will strike the upper surface of lower guide 104 and be guided upwardly. However, sheet 116 cannot advance beyond the edge 105 of guide 104 until the trailing edge of the top sheet 114 has cleared lower guide 104.

As was pointed out above, feed rollers 80 and 82 (FIGURE 4) of paper feed 26 are driven by shaft 86 through belts 88 and 90. Shaft 86 is journalled in suitable bearings (not shown) supported on the side walls 60 of printer base 54. Fixed on shaft 86 is a feed roller 118 which cooperates with a mating feed roller 120 fixed on a shaft 122 to move the copy paper through the printer. Shaft 122, like shaft 86, may be rotatably mounted in suitable bearings supported from base side walls 60.

Fixed to the ends of shafts 86 and 122, respectively, are a pair of intermeshing spur gears 124 and 126, see FIGURE 4. Spur gear 126 is the output member of an electromagnetic clutch 128 which may be supported in any suitable manner on base side wall 60. The input member of electromagnetic clutch 128 is a spur gear 130 engaged by a roller chain 132.

As is best shown in FIGURE 4, roller chain 132 is driven by a spur gear 134 fixed to the output shaft of an electric driving motor 138 which operates continuously when printer 20 is energized. Therefore, when electromagnetic clutch 128 is energized a drive train will be established from drive motor 138 through roller chain 132, electromagnetic clutch 128, and spur gears 124 and 126, rotating feed rollers 118 and 120 in opposite directions to move a sheet of copy paper through them. With electromagnetic clutch 128 energized, a further drive train is established through pulleys 96 and 98 and belts 88 and 90 to pulleys 92 and 94, rotating feed rollers 80 and 82 to withdraw copy paper from paper compartment 24 into feed rollers 118 and 120. Motor 138 may be supported from base side walls 60 by appropriate brackets (not shown). A fan 139 fixed to the end of motor output shaft opposite spur gear 134 circulates air throughout the printer.

The next components in paper feed 26 are an idler roller 140 (see FIGURES 2 and 4) over which the copy paper passes as it moves from between guide rollers 118 and 120 and a pair of guides 141 and 142 between which the copy paper moves to a point where it is picked up by rollers 143 and 144. Idler roller 140 is fixed on a shaft rotatably supported in appropriate bearings (not shown) fixed to base side walls 60. Guides 141 and 142 may be formed from sheet metal and are supported on base side walls 60. Idler roller 140 assists the copy paper in moving freely between guides 141 and 142 to pick-up rollers 143 and 144.

Pick-up rollers 143 and 144 are mounted on shafts 147 and 158 rotatably supported in bearings (not shown) fixed to base side walls 60. Pick-up roller 143 is continuously rotated by roller chain 132 which engages a spur gear 150 fixed to roller shaft 147. Roller 144 is driven by roller 143.

Next in paper feed system are a pair of pick-up rollers 152 and 154, located below the charging electrodes of corona unit 27, similar to the feed rollers 118 and 120 described above and rotatably supported from base side walls 60 in the same manner as the latter. Roller 152 is continuously rotated by drive chain 132 via spur gear 156 fixed to the shaft on which roller 152 is mounted. Roller 152, in turn, frictionally drives roller 154.

The next component in paper feed 26 is an endless conveyor 160 which includes driven and driving rollers 162 and 164 rotatably supported in parallel, spaced apart relationship by suitable bearings (not shown) fixed to base side walls 60. An endless conveyor belt 160 extending around rollers 162 and 164 maintains the copy paper flat while the image of the original document is projected on it by image projector 28.

Conveyor belt 160 is continuously operated by roller chain 132 which engages a spur gear 166 rotatably supported from base side wall 60. Spur gear 166 meshes with a spur gear 168 fixed to the end of the shaft 170 on which driving roller 164 is mounted.

Endless conveyor 160 guides the copy paper to a pair of pick-up rollers 172 and 174 which may be supported from the base side walls 60 in the same manner as pick-up rollers 152 and 154, for example. Roller 174 is continuously rotated by a spur gear 176 fixed to the end of endless conveyor shaft 170 opposite spur gear 168. Spur gear 176 meshes with an idler gear 178 rotatably supported from base side wall 60. Idler gear 178, in turn, meshes with and drives a spur gear 180 fixed adjacent the end of the shaft 182 on which roller 174 is mounted. Roller 174 frictionally drives roller 172.

Disposed immediately below pick-up rollers 172 and 174 are a pair of parallel, spaced apart sheet metal guides 184 and 186, see FIGURE 2, which are supported from base side walls 60 and between which the copy paper is guided into developing tank 44.

As the copy paper leaves developing tank 44, it is picked up and passed through squeegee rollers 46 and 48 which are rotatably supported from base side walls 60 by suitable bearings (not shown). From the squeegee rollers the copy paper passes between a pair of spaced apart guides 187 and 188, which are fastened to base side walls 60, into pick-up rollers 189 and 190. Rollers 189 and 190 are rotatably journalled in suitable bearings (not shown) fixed to housing side walls 60. Roller 189 is driven by roller chain 132 which engages a spur gear 191 fixed to the shaft 192 on which roller 189 is mounted. Roller 189 drives roller 190 by friction and squeegee roller 48 by a drive train including a spur gear 193 fixed to the end of shaft 192 opposite spur gear 191. Spur gear 193 meshes with an idler gear 194 supported in suitable bearing (not shown) fixed to base side walls 60. Idler gear 194 meshes with a spur gear 195 fixed to the shaft 196 on which squeegee roller 48 is mounted. Squeegee roller 48 drives squeegee roller 46 by friction. From rollers 189 and 190 the copy paper passes over a sheet metal guide 197 fastened to the base side wall 60 onto the final component of paper feed 26, an endless conveyor 198 which includes a pair of parallel, spaced apart rollers 199 and 200 rotatably supported from base side wall 60. Looped around rollers 199 and 200 are a plurality of spaced apart cords 201 which carry the copy paper downwardly and forwardly into a discharge tray surface 52. The spaced apart cords 201 permit air to be circulated around the exposed and developed copy paper to dry it.

Endless conveyor 198 is continuously driven by roller chain 132 which engages a spur gear 202 fixed to a shaft 203 which is rotatably supported from base side wall 60. Fixed on shaft 203 with spur gear 202 is a spur gear 204 which meshes with a spur gear 205 fixed on shaft 206 on which roller 200 is mounted.

As was pointed out above, paper feed 26, after withdrawing a sheet of copy paper from paper supply compartment 24, first feeds the sheet of copy paper through a corona unit 27 where a uniform charge of approximately −400 v. is imparted to its surface.

A satisfactory paper may consist of a coating of photoconductive material on a supporting base. The photoconductor is typically solid zinc oxide particles which are dispersed in a resin coating. The resin has a high electrical resistance and may be selected from silicones, polyesters, styrene-butadiene copolymers and cellulose esters, and forms a smooth, uniform, highly adherent coating on the paper base. The paper may be made to have a charge when it leaves the corona unit on the order of 400 volts.

*Image transfer*

Pick-up rollers 152 and 154 at the exit side of corona unit 27, it will be remembered, deliver the charged copy paper onto the belt of endless conveyor 160 where image projector 28 projects the image of the document to be copied onto the copy paper. Image projector 28, which may be of substantially conventional construction, includes a light tight housing 269 with the objective lens 40 supported in its upper forward end. A projection lens 270 is supported in the lower rearward end of housing 269 closely adjacent the upper run of endless conveyor 160. Image projector 28 is supported by a sheet metal support member 271 (see FIGURE 2) fixed at its opposite ends to base side walls 60.

The original document which it is desired to copy, it will be remembered, is inserted into printer 20 through a horizontal slot 30 in the front wall of its housing 22 where it is picked up by the original document feed 34. Referring now to FIGURES 1 and 4, feed 34 includes a horizontal sheet metal guide 272 fixed to base side walls 60 which guides the original into a pair of pick-up rollers 273 and 274 rotatably mounted in suitable bearings (not shown) fixed to base side walls 60. Roller 273 is continuously rotated by roller chain 132 which engages a spur gear 276 fixed to a shaft 278 rotatably supported on base side wall 60. Fixed to shaft 278 with spur gear 276 is a second spur gear 280 which meshes with a spur gear 282 fixed to the shaft 284 on which roller 273 is mounted. Roller 274 is driven by roller 273.

The next components of document feed 34 are pick-up rollers 286 and 288 which are separated from pick-up rollers 273 and 274 by a horizontally extending sheet metal guide 289 supported by base side walls 60. Pick-up rollers 286 and 288 are rotatably mounted in suitable bearings (not shown) fixed to base side walls 60. Roller 288 is continuously rotated by roller chain 132 which engages a spur gear 290 fixed to the end of the shaft 292 on which roller 288 is mounted. As in the other pick-up rollers described above, roller 288 frictionally drives roller 286.

Pick-up rollers 286 and 288 deliver the document to be copied onto an endless conveyor 294 which includes a pair of rollers 296 and 298 rotatably journalled in parallel, spaced relationship by appropriate bearings (not shown) fixed to base side walls 60. Surrounding conveyor rollers 296 and 298 is an endless belt 300 which supports the document to be copied while it is in the imaging area below the forward upper end of image projector 28. Endless conveyor belt 300 is driven by a spur gear 302 fixed to the end of the shaft 304 on which pick-up roller 286 is mounted. Spur gear 302 meshes with a spur gear 306 fixed to the shaft 308 on which endless conveyor roller 296 (see FIGURE 2) is mounted. The movement of the document to be copied while on conveyor belt 300 is synchronized with movement of the copy sheet on conveyor belt 160 by roller chain 132 and the movement of the copy sheet is coordinated by use of feeler switches and electromagnetic clutches through a circuit shown in FIGURE 5.

As the leading edge of the document to be copied travels off the rear end of endless conveyor 294, it passes between a pair of pick-up rollers 310 and 312 rotatably mounted in appropriate bearings (not shown) fixed to base side walls 60. Pick-up roller 310 is continuously rotated by roller chain 132 which engages a spur gear 314 rotatably supported by housing side walls 60. Spur gear 314 meshes with spur gear 316 fixed to the end of the shaft 318 on which roller 310 is mounted. Roller 310, in turn, friction drives roller 312.

Next in feed system 34 is a chute 320 formed from an arcuate wall portion 322 at the forward end of the support 271 on which image projector 28 is mounted and an arcuate sheet metal guide 324 supported from base side walls 60 in spaced, parallel relationship to support wall portion 322. Chute 320 diverts the document from its rearwardly moving travel back toward the front of printer 20. As the document emerges from chute 320, it passes beneath axially aligned and transversely spaced feed rollers 326, 328, and 330 which deposit the document on a tray 332 formed as an integral portion of the image projector supporting member 271. Feed rollers 326, 328, and 330 are fixed on a continuously rotating shaft 334 which is rotatably supported in appropriate bearings (not shown) fixed to housing side walls 60. Shaft 334 is rotated by roller chain 132 which engages a spur gear 336 fixed to a stub shaft 338 rotatably supported on housing side wall 60. Fixed on shaft 338 with spur gear 336 is a second spur gear 340 which meshes with a spur gear 342 fixed on the end of roller supporting shaft 334.

As was pointed out above, it is the function of feed system 34 to transport the document to be copied to an imaging area below the upper forward end of image projector 28. In this area, the document to be copied is illuminated by projection lamp 36 which, as is shown in FIGURES 2 and 4, is mounted in a conventional parabolic reflector 344 supported from housing side walls 60. The light from projection lamp 36 reaches the document supported on endless belt 300 through a slit 346 in a sheet metal member 348 supported from base side walls 60 closely adjacent and parallel to the upper run of endless conveyor 294.

It will be remembered that the image on the document is reflected from its surface to a mirror 38. Mirror 38 is supported at an upwardly and rearwardly inclined angle adjacent the forward upper end of printer housing 22 in a supporting bracket 350 fixed, at its ends, to base side walls 60. The details of mirror 38 and its supporting brackets 350 are not critical in the practice of the present invention and may be of any commercially available construction.

*Mode of operation*

Referring now specifically to FIGURE 5, the operation of printer 20 is as follows: main on-off switch #9, which is mounted on the front of printer base 54 (see also FIGURES 1 and 2), is closed. Connected in series with switch #9 are a pair of interlock switches #7 and #8 mounted on printer base 54 (see FIGURE 2). Switches #7 and #8 open when cover 22 is removed, preventing operation of the printer unless the cover is in place. With cover 22 in place safety switches #7 and #8 are always closed and the closing of main switch #9 completes circuits through drive motor 138, a pump motor 358 in developing tank 44, exhaust fans 50, and on-off lamps 360 mounted on the front of printer base 54 (see FIGURE 1), and electromagnetic clutch 128 through normally closed switch #3. Switch #3 is open when a sheet of copy paper is in position to start through corona charging unit 27.

The function of pump 358 is not germane to an understanding to the present invention, other than that it circulates a liquid developer or toner solution which carries pigment particles that adhere to the charged portion on the copy paper as it passes through the solution. This pump, the developer tank and their operation are described in detail in my copending application Ser. No. 143,086, now U.S. Patent No. 3,202,526, to which reference may be had if desired.

Energization of fans 50, as was indicated above, effects a flow of air in printer 20 to remove the heat of operation from the printer and to assist in drying the developed copy paper after it leaves developer tank 44 and passes through squeegee rollers 46 and 48.

Energization of drive motor 138 effects operation of the paper feeds 26 and 34 described above. With drive motor 138 running and electromagnetic clutch 128 energized, feed rollers 80 and 82 are rotated in a clockwise direction as viewed in FIGURE 4, through the drive train described above, feeding a sheet of copy paper from stack 103 through the slot formed at the rear end of paper supply compartment 24 between guides 104 and 106 to the pick-up rollers 118 and 120.

The sheet of copy paper passes through feed rollers 118 and 120, over idler roller 140, and between guides 141 and 142 until its leading edge engages the actuator of a normally closed switch #3 and a normally open switch #6, opening switch #3 and closing switch #6. Both of these switches are mounted on guide 142 (see FIGURE 4).

The opening of normally closed switch #3 interrupts the circuit to electromagnetic clutch 128 which is then deenergized, stopping feed rollers 80 and 82 on top of the stack of copy paper and feed rollers 118 and 120. The stopping of feed rollers 118 and 120 stops the sheet of copy paper passing through the printer with its leading edge just short of pick-up rollers 143 and 144 insuring that, when a document to be copied is inserted into the machine, the document and copy paper will move in timed relation through their respective imaging areas so that the entire image will be transmitted to the copy paper. The stopping of feed rollers 80 and 82 insures that a second sheet of copy paper is not fed indiscriminately from supply compartment 24.

The closing of normally open switch #6 completes a circuit through a reload-warning lamp 368 mounted on the front side of printer base 54 (see FIGURE 1), lighting lamp 368 and indicating to the operator that the printer is conditioned to receive a document to be copied.

If the copy paper is exhausted when printer 20 is on, switch #6 will not close and feed-reload lamp 368 will not light. Thus if lamp 368 does not light within a few seconds after main switch #9 is closed, or after a document is inserted through slot 30, the operator will know that the supply of copy paper is exhausted. If this occurs main switch #9 may be opened, turning off the printer, and the supply of copy paper replenished. Main switch #9 is then closed, reinitiating the printing cycle.

As the document to be copied is inserted through the slot 30 in printer base front wall 32, it is picked up and fed into the printer by continuously rotating rollers 273 and 274. Shortly after it passes through rollers 273 and 274, the leading edge of the original contacts the actuators of two normally open switches #1 and #5 mounted on guide 289 with their actuators in the path of the inwardly moving original.

The closing of normally open switch #1 completes a circuit through a thermal fuse 376 to the coil of a relay 378 energizing the relay which closes normally contacts 377. The closing of contacts 377 completes a circuit through and lights projection lamps 36 (which may be fixed in end-to-end relationship in reflector 344).

The closing of normally open relay contact 377 simultaneously completes a circuit through the primary of transformer 379. The secondary of transformer 379 is connected in the high voltage circuit of corona 27 which is nowhere grounded and therefore floats with respect to the reference voltage in the printer housing. For reasons which are not fully understood, it has been found that this arrangement prevents discoloration on the copy sheet which sometimes occurs when a ground connection is used.

The D.C. potential between the negative and positive output terminals of voltage doubler 380 is on the order of 11,500 volts.

The closing of normally open switch #5 completes a circuit through a normally closed switch #4 and again momentarily energizes electromagnetic clutch 128 and causes rotation of feed rollers 118 and 120 which move the sheet of copy paper downwardly between guides 141 and 142 until its leading edge is engaged by continuously rotating pick-up rollers 143 and 144.

An instant after the leading edge of the sheet of copy paper is picked up by rollers 143 and 144, its trailing edge clears feed rollers 118 and 120. Simultaneously, the leading edge of the original opens normally closed switch #4 (which is mounted on guide 289 with its actuator positioned to be engaged by the rearwardly moving original), de-energizing electromagnetic clutch 128 and stopping feed rollers 80 and 82 and feed rollers 118 and 120.

As pick-up rollers 143 and 144 move the sheet of copy paper downwardly, its trailing edge passes switches #3 and #6 permitting switch #6 to open and switch #3 to close. The opening of switch #6 extinguishes the feed reload warning lamp 368, warning the operator not to attempt to insert another original into the printer. If an original were fed into the printer at this point in the printing cycle, the original would precede the copy paper through the imaging areas, producing an incomplete copy.

The closing of switch #3 again energizes electromagnetic clutch 128, revolving feed rollers 80 and 82 in a clockwise direction and causing the top sheet of copy sheet of copy paper in stack 103 to be fed out of paper supply compartment 24 between feed rollers 118 and 120. Shortly after the leading edge of this sheet of copy paper passes through the feed rollers it engages the actuators of switches #3 and #6, opening switch #3 and closing switch #6. Opening of switch #3 stops feed rollers 118 and 120 positioning the incoming sheet of copy paper with its leading edge slightly above feed rollers 143 and 144 so that, when another document to be copied is inserted into printer 20, the incoming copy paper will be picked up and moved through the printer in timed relation to the document in the manner described above.

The simultaneous closing of switch #6 relights feed-reload lamp 368 indicating to the operator that the printer is conditioned to receive another document to be copied.

It will be apparent, from the above discussions, that several sheets of copy paper may be moving simultaneously through printer 20, each of the sheets being at a different stage in the printing cycle. Consequently, successive prints can be produced at a relatively rapid rate, on the order of one copy every six seconds.

After moving through rollers 143 and 144, the sheet of copy paper which triggered the reloading cycle just described passes through corona unit 27. As the paper moves through corona unit 27, uniform negative charge is provided on the upper surface of the paper, and a similar positive charge on the lower surface, the total charge being about 400 volts in the illustrated embodiment.

The copy paper is a two layer system composed of a base which preferably has a resistance between approximately 50 and 500 megohms to the square and a photoconductive layer or coating which may comprise a photoconductive material such as zinc oxide in a resin binder. Therefore, when the copy paper leaves corona unit 27, the surface of the photoconductive layer will be uniformly charged.

As the copy sheet emerges from corona unit 27, its leading edge is picked up by rollers 152 and 154. Simultaneously, the leading edge of the original is picked up by rollers 286 and 288. Thereafter, the original and the copy paper moves at the same speed to their respective imaging areas, the original passing from feed rollers 286 and 288 onto endless conveyor 294 which carries it to the imaging area below the upper forward end of image projector 28. The copy paper moves from rollers 152 and 154 onto endless conveyor 160 which carries it to the imaging area adjacent the lower rear end of image projector 28.

As the original document passes through its imaging area, it is struck by the light emitted from projection lamps 36 and focused on the imaging area by parabolic reflector 344. The image on the document reflected from the upper surface of the original to mirror 38 which reflects it into the image projector 28 through objective 40. The image passes through image projector 28, emerges through projection lens 270, and strikes the negatively charged surface of the copy paper. The uniform negative charge on the copy paper is reduced in proportion to the intensity of the light striking the copy paper. Since little light will be reflected from the black areas of the original, the charge on areas of the copy paper against which the light reflected from such areas strikes will be reduced very slightly. On the other hand, the charge on areas of the copy paper struck by the light reflected from white areas of the original, such as the white background of a letter, e.g., will be almost entirely dissipated since the most intense light will be reflected from those areas.

As the original and the copy paper continue through their respective imaging areas, the image on the original is reproduced in latent form on the copy paper through dissipation of the charge on its surface as described above.

As the leading edge of the original emerges from its imaging area, it passes off the end of endless conveyor 294 and is picked up by rollers 310 and 312. Pick-up rollers 310 and 312 propel the original between guides 322 and 324 to feed rollers 326, 328, and 330 which deposit it in tray 332 from which it may be removed and reinserted into the printer of multiple copies are desired. The originals are deposited face down in tray 332. Therefore, if consecutively numbered originals are fed through printer 20, they will be deposited in tray 332 in the same order.

Simultaneously, the leading edge of the exposed sheet of copy paper leaves the imaging area and is picked up by rollers 172 and 174 which move it toward developing tank 44.

As the leading edge of the copy paper emerges from rollers 172 and 174, it engages the actuator of and closes a normally open switch #2 mounted on guide 184 immediately below roller 174 as best seen in FIGURES 2 and 4. Closing of switch #2 completes a holding circuit through relay coil 378 as shown in FIGURE 8. Thus, when the trailing edge of the original clears switch #1, permitting that switch to open, the projection lamps 36 will not be prematurely extinguished. When the trailing edge of the copy paper clears switch #2 (by which time the trailing edge of the original will have cleared its imaging area) switch #2 will open, de-energizing relay 378. Upon relay coil 378 being de-energized, its contacts 377 open turning off projection lamps 36 and opening the circuit applying operating voltage to corona unit 27.

*Development of latent image*

The developing tank 44 is located as closely as practicable to the image forming area for the copy sheet at conveyor belt 160. The copy paper is directed onto curved wire guide members 382 shown in dotted lines in FIGURE 2 at the top central portion of tank 44. The liquid toner with electrostatically attractable particles is forced through an apertured header 384 by the pump driven by pump motor 358 and applied to the upper surface only of the copy paper. Suitable electrostatic toners are well known in the art and include the examples described in United States Patent No. 3,001,888 to Metcalfe, et al., and in the Journal of Scientific Instruments, volume 32, February 1955, pages 74 and 75. In such toner solution the polarity of the charge on the pigment particles can be controlled to be either negative or positive.

In the embodiment described, it will be assumed the pigment particles have a positive charge and therefore will be attracted to image area locations on the surface of the copy sheet that contain a negative charge. The upper surface of the copy paper that passes beneath header 384 in developer tank 44 has a negative charge distribution in accordance with the electrostatic latent image to be developed. The liquid applied to the upper surface runs off the sides of the paper without wetting the underneath side of the copy sheet as more fully described in my copending application Ser. No. 143,086, now U.S. Patent No. 3,202,526.

Any liquid adhering to the surface of the copy sheet is removed by squeegee rollers 46 and 48, and runs back into the reservoir of toner in tank 44. The copy paper then passes between rollers 189, 190 and into the stream of heated air circulated by fans 50 across lamps 36 to remove such moisture as remains on the copy sheet to thereby provide a nearly dry copy at surface 52.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a duplicating machine having means defining a storage compartment containing photosensitive copy paper; means defining a copy paper travel path including a first conveyor means, a copy paper image forming area and a developing station; and means defining a document travel path including a document exposing area, which along with said copy paper image forming area forms an exposing station; the combination of:
    (a) means for advancing said copy paper from its storage position in said storage compartment to said first conveyor means;
    (b) means for stopping the advancing copy paper with its leading edge at a predetermined position between said storage compartment and said first conveyor means;
    (c) means for advancing a document to be copied along said document travel path and through said document exposing zone;
    (d) means responsive to the advancement of said document along said document travel path to reinitiate movement of said copy paper to a position when it is picked up by said first conveyor means for advancement through said image forming area in timed relation with movement of said document through said exposure area;
    (e) means for moving said copy paper through said developing station; and
    (f) said means for stopping the advancing copy paper comprising circuit means under the control of the copy paper during its movement past said predetermined position for rendering said copy paper advancing means inoperative to advance the next sheet of stored copy paper to said predetermined position.

2. The duplicating machine as defined in claim 1 wherein the copy paper is supplied in the form of stacked sheets in said storage compartment together with means for feeding the uppermost sheet one at a time from said storage compartment into said copy paper travel path.

3. The duplicating machine as defined in claim 1 wherein said copy paper advancing means is operated by said circuit means to advance the next sheet of copy paper to said predetermined position only after the trailing edge of the preceding sheet of copy paper clears said predetermined position.

4. The duplicating machine as defined in claim 1 comprising means remotely located from said storage compartment outlet and providing for the insertion of a document to be copied into said document travel path.

5. In an electrostatic printer having means defining a storage compartment adapted to contain stacked photosensitive copy paper; means defining a copy paper travel path including seriatim a charging station capable of providing a substantially uniform charge on the copy paper while the copy paper moves through the charging station, a copy paper image forming area and a developing station; and means defining a document travel path including a document exposing area, which along with said copy paper image forming area forms an exposing station, the combination of:
    (a) means for advancing said copy paper from its storage position in said storage compartment and along said copy paper travel path;
    (b) means actuated by the copy paper advancing from said storage compartment for stopping said copy paper with its leading edge at a predetermined position between said compartment and said image forming area;
    (c) means for advancing a document to be copied along said document travel path and through said document exposing zone;
    (d) means responsive to the advancement of said document along said document travel path to reinitiate movement of said copy paper for advancement through said image forming area in timed relation with the advancement of said document through said exposing area to enable the transfer of an image from said document to said copy paper as the document and copy paper pass through their respective areas; and
    (e) means for moving said copy sheet through said developing station;
    (f) said means actuated by the advancing copy paper comprising switch means under the control of the copy paper during its movement past said predetermined position for rendering said copy paper advancing means inoperative to advance the next sheet of copy paper to said predetermined position.

6. In an electrostatic printer having means defining a storage compartment containing stacked sheets of cut photoconductive copy paper, means defining a copy sheet travel path including seriatim a charging station capable of providing a substantially uniform charge on the copy sheet while the copy sheet moves through the charging station, a copy sheet image forming area and a developing station, and means defining a document travel path including a document exposing area, which along with said copy sheet image forming area forms an exposing station; the combination of:
    (a) means including intermittently driven rollers for advancing the top copy sheet from said stack, one at a time through an outlet in said storage compartment and along said copy sheet travel path;
    (b) means responsive to the advancement of the copy paper from said storage compartment for stopping said intermittently driven rollers to arrest the advancement of the copy paper with its leading edge at a position that is intermediate said outlet and said charging station;
    (c) means for advancing a document to be copied along said document travel path and through said document exposing area;
    (d) continuously driven rollers spaced from said intermittently driven rollers for advancing copy sheets through said charging station, said copy sheet image forming area, and said developing station; and
    (e) means responsive to the movement of said document through a predetermined region along said document travel path for momentarily driving said intermittently driven rollers to advance said copy sheet from said predetermined position to a position where it is picked up by said continuously driven rollers for advancement thereby through said copy sheet image forming area in timed relation with the advancement of said document through said document exposing area to enable the transfer of an image from said document to said copy paper as the document and copy paper pass through their respective areas;
    (f) said means for stopping said intermittently driven rollers comprising circuit means under the control of the sheet of copy paper as it is advanced past said predetermined position by said continuously driven rollers for preventing operation of said intermittently driven rollers after said intermittently driven rollers are momentarily operated by the movement of said document through said predetermined region.

7. In a copy machine: a copy paper supply means; first conveyor means for moving copy paper through a copy paper exposing zone; second conveyor means for moving a document to be copied through a document exposing zone in correlated relation to the passage of the copy paper through its exposing zone to effectuate transfer of the image on the document onto the copy paper; and third conveyor means for moving copy paper outwardly from the supply means to a rest position such that the leading edge of said copy paper is adjacent said first conveyor means and thereafter for delivering said copy paper to said first conveyor means when said document reaches a predetermined position along its path of movement, for movement in correlated relation with the document to be copied, said third conveyor means comprising: a clutch means, a first microswitch (#3) located at said predetermined position for stopping said third conveyor means, second and third microswitches (#5 and #4) respectively actuatable sequentially by said document starting said third conveyor means to deliver said copy paper into said first conveyor means and thereafter stopping said third conveyor means, the trailing edge of the copy sheet delivered into the first conveyor means being effective to activate said first microswitch to re-start said third conveyor means.

8. A device as defined in claim 7 wherein said supply means is a compartment, said copy paper and said document are each continuously moved across their respective exposing zones in time relation, said first and second conveyor means are continuously operated and said third conveyor means is intermittently operated during machine operation, and said copy paper is a plurality of single stacked sheets adapted to be individually sucessively fed through said copy machine.

9. The copy machine as defined in claim 7, including an operator observable feed-reload lamp and means actuated by arrival of a sheet of copy paper at the position adjacent the first conveyor means for controlling said lamp to indicate to the operator that the machine is conditioned to receive a document to be copied.

10. In an electrostatic printer, a copy paper supply compartment; a copy paper feed for moving copy paper from said compartment through an electrostatic charging station, a copy paper exposing area, and a developing station to a first operator accessible depository; a document paper feed for moving a document to be copied through a document exposing area and returning said document to a second operator accessible depository; said copy paper feed including an intermittently operating portion for moving said copy paper from said supply compartment to a point adjacent said charging station and a continuously operating portion for moving said copy paper without pause through said charging station, said exposing area and said developing station to said first depository; and means activated by movement of a document through said document paper feed for initiating operation of said intermittently operating portion to deliver said sheet of copy paper from the intermittently operating portion to the continuously operating portion of the copy paper feed.

11. The electrostatic printer as defined in claim 10 including an electromagnetic clutch with its output connected in driving relationship to the components of the intermittently operating portion of the copy paper feed, a continuously operating drive motor, and means drive connecting said motor to the document paper feed, to the continuously operating portion of the copy paper feed, and to the input of the electromagnetic clutch.

12. In a copy machine: a copy paper supply compartment; first conveyor means for moving a document to be copied through a document exposure zone; second conveyor means operated continuously with said first conveyor means for moving sheets of copy paper one at a time through a copy paper exposure zone; intermittently operated conveyor means for withdrawing sheets of copy paper one at a time from said supply compartment and for stationarily positioning such withdrawn sheet adjacent to be spaced from said second conveyor means; and means actuated by the document being advanced by said first conveyor means for momentarily driving said intermittently operated conveyor means to deliver said stationarily positioned sheet to said second conveyor means for movement by said second conveyor means through said copy paper exposure zone in timed relation with the movement of said document by said first conveyor means through said document exposure zone to thereby enable the transfer of an image from said document to the copy paper as the document and copy paper are advanced through their respective zones.

13. In an electrostatic printer the combination of:
(a) a storage compartment for storing a stack of precut copy sheets;
(b) a first pair of intermittently operable rollers contiguous with the upper surface of the top sheet of said stack;
(c) a lower guide means integral with the bottom wall of said compartment having a horizontally extending bottom wall and an upwardly inclined end portion;
(d) an upper guide means having a main body spaced above said lower guide bottom wall and substantially parallel to said wall, an inner upwardly inclined end portion facing said stack, an outer end portion above said lower guide end portion and substantially parallel to said main body portion and an upwardly inclined connecting portion disposed between said main body portion and said outer end portion and substantially parallel to said lower guide end portion;
(e) a seond pair of intermittently operable rollers disposed adjacent the outer ends of said guide means and operatively connected to said first intermittently operable rollers;
(f) an electromagnetic clutch for intermittently driving said first and second intermittently operable rollers;
(g) a first switch for disengaging said electromagnetic clutch when a sheet of copy paper from said stack has moved to a predetermined location;
(h) a first pair of continuously operable rollers having an entrance side disposed adjacent said predetermined location;
(i) a charging station adjacent the exit side to said first pair of continuously operable rollers;
(j) an image forming station positioned to receive a charged copy paper from said charging station for forming a latent image thereon;
(k) a developing station positioned to receive a charged copy paper from said charging station;
(l) a drying station positioned to receive said copy paper from said developing station;
(m) a first operator accessible depository positioned to receive said copy paper from said drying station;
(n) an original document inlet for insertion of a document to be copied;
(o) a second pair of continuously operable rollers;
(p) a second switch for energizing a radiation source;
(q) a third switch for engaging said electromagnetic clutch when said document is advanced to a predetermined point so that said copy paper in said predetermined location is advanced into said first pair of continuously operable rollers to move in timed relation with said document;
(r) an exposing station, positioned to receive said document from said second pair of continuously operable rollers when said image forming station receives said copy sheet, optically communicating with said radiation source and said image forming station;
(s) a second operator accessible depository positioned to receive said document from said exposing station.

14. In an electrostatic printer, a stack of sheets of copy paper, first and second paper feeds for simultaneously transmitting a document to be copied and a single sheet of copy paper through remotely located exposing areas, means including at least one source of projection radiation for projecting the image on the document onto the copy paper as the document and copy paper pass through their respective exposing areas, means actuated by said document before it reaches its exposing area for energizing said radiation source, and means actuated by said copy paper as its leading edge emerges from its exposing area for completing a holding circuit through said radiation source to maintain said radiation source energized until said copy sheet completely clears its exposing area.

15. The electrostatic printer as defined in claim 14, wherein said document actuated means includes a switch with its actuator disposed in the path of movement of said document, said switch being closed by the leading edge of the document engaging said actuator and being opened by the trailing edge of said document clearing said actuator.

16. The electrostatic printer as defined in claim 15, wherein said copy paper actuated means includes a switch with its actuator disposed in the path of movement of said copy paper, said switch being closed by the leading edge of said paper engaging said actuator and being opened by the trailing edge of said paper clearing said actuator.

17. In a duplicating machine having copy paper and document exposure zones, means for advancing a document to be copied through said document exposure zone, a copy paper storage compartment, first conveyor means for advancing sheets of copy paper through said copy paper exposure zone, second conveyor means for advancing the sheets of copy paper seriatim from said storage compartment to said first conveyor means, control means responsive to advancement of copy paper by said second conveyor means for stopping said second conveyor means to arrest the copy paper with its leading edge at a predetermined position between said storage compartment and said copy paper exposure zone, and means responsive to advancement of said document toward said document exposure zone for momentarily re-actuating said second conveyor means to advance said copy paper from said predetermined position to a position where it is picked up by said first conveyor means for advancement through said copy paper exposure zone in timed relation with the movement of said document through said document exposure zone, thereby enabling the transfer of an image from said document to said copy paper as the copy paper and document pass through their respective zones, said control means, following the momentary actuation of said second conveyor means by the moving document, being responsive to the copy paper being advanced by said first conveyor means to prevent actuation of said second conveyor means until after the copy paper passes beyond said predetermined position.

References Cited

UNITED STATES PATENTS

| | | | |
|---|---|---|---|
| 2,153,154 | 4/1939 | Nivison | 271—8 |
| 2,235,844 | 3/1941 | Nelson | 271—41 |
| 2,357,674 | 9/1944 | McConnell | 88—24 |
| 2,492,127 | 12/1949 | Hessert | 88—24 |
| 3,044,386 | 7/1962 | Limberger | 95—77.5 |
| 3,051,568 | 8/1962 | Kaprelian | 95—1.7 X |
| 3,182,578 | 5/1965 | Limberger | 95—77.5 |
| 3,211,074 | 10/1965 | Heiart | 95—77.5 X |

JOHN M. HORAN, *Primary Examiner.*

UNITED STATES PATENT OFFICE
CERTIFICATE OF CORRECTION

Patent No. 3,352,218                                                November 14, 1967

Ralph G. Ostensen

It is hereby certified that error appears in the above numbered patent requiring correction and that the said Letters Patent should read as corrected below.

In the drawings, Sheet 1, Fig. 2, the reference numeral 386 and its lead line is deleted; same Fig. 2, the broken or dash lead line of reference numeral 100 is extended to the lower left pin on arm 102; column 4, line 46, for "158" read -- 148 --; column 8, line 36, after "normally" insert -- open --; column 9, line 48, for "moves" read -- move --; line 60, after "document" insert -- is --; column 10, line 13, for "of" read -- if --; line 27, for "FIGURE 8" read -- FIGURE 5 --; line 58, for "attrached" read -- attracted --; column 13, line 29, for "time" read -- timed --; column 14, line 2, for "be" read -- but --.

Signed and sealed this 11th day of March 1969.

(SEAL)
Attest:

EDWARD M.FLETCHER,JR.                          EDWARD J. BRENNER
Attesting Officer                                        Commissioner of Patents